(12) United States Patent
Cowell

(10) Patent No.: US 10,476,630 B2
(45) Date of Patent: Nov. 12, 2019

(54) DIGITAL BUS NOISE SUPPRESSION

(71) Applicant: SAMSUNG ELECTRONICS CO., LTD., Suwon-si, Gyeonggi-Do (KR)

(72) Inventor: Michael John Cowell, Cambridge (GB)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 26 days.

(21) Appl. No.: 15/864,639

(22) Filed: Jan. 8, 2018

(65) Prior Publication Data

US 2019/0215094 A1    Jul. 11, 2019

(51) Int. Cl.
*G06F 13/38* (2006.01)
*H04L 1/00* (2006.01)
*G06F 13/42* (2006.01)

(52) U.S. Cl.
CPC .......... *H04L 1/003* (2013.01); *G06F 13/4282* (2013.01)

(58) Field of Classification Search
None
See application file for complete search history.

(56) References Cited

U.S. PATENT DOCUMENTS 9,554,338 B2 * 1/2017 Sun .................. H04W 52/244
9,672,834 B2 * 6/2017 Pandey ............... H04R 25/353
10,032,462 B2 * 7/2018 Pandey ............... G10L 19/022

* cited by examiner

*Primary Examiner* — Cheng Yuan Tseng
(74) *Attorney, Agent, or Firm* — F. Chau & Associates, LLC

(57) ABSTRACT

A data bus interface may include a history buffer and a serializer. The history buffer may store bits representing a history of data recently transmitted on the data bus. The serializer may be configured to modify an input bit sequence containing original bits by interspersing padding bits with the original bits to suppress noise at one or more target frequencies. The serializer may output the modified input bit sequence on the data bus. Each padding bit of the plurality of padding bits may be generated based on values of at least two bits stored in the history buffer.

31 Claims, 13 Drawing Sheets

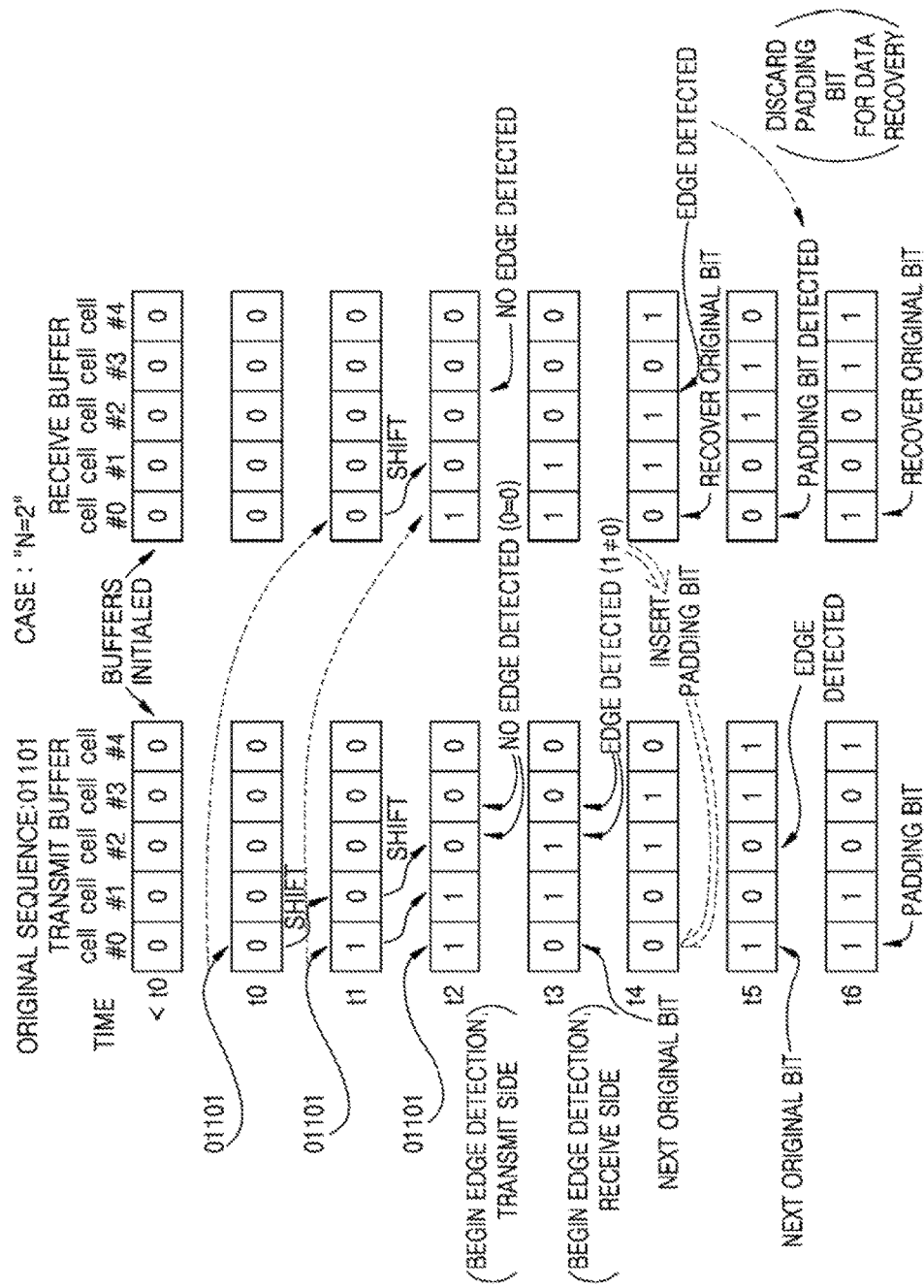

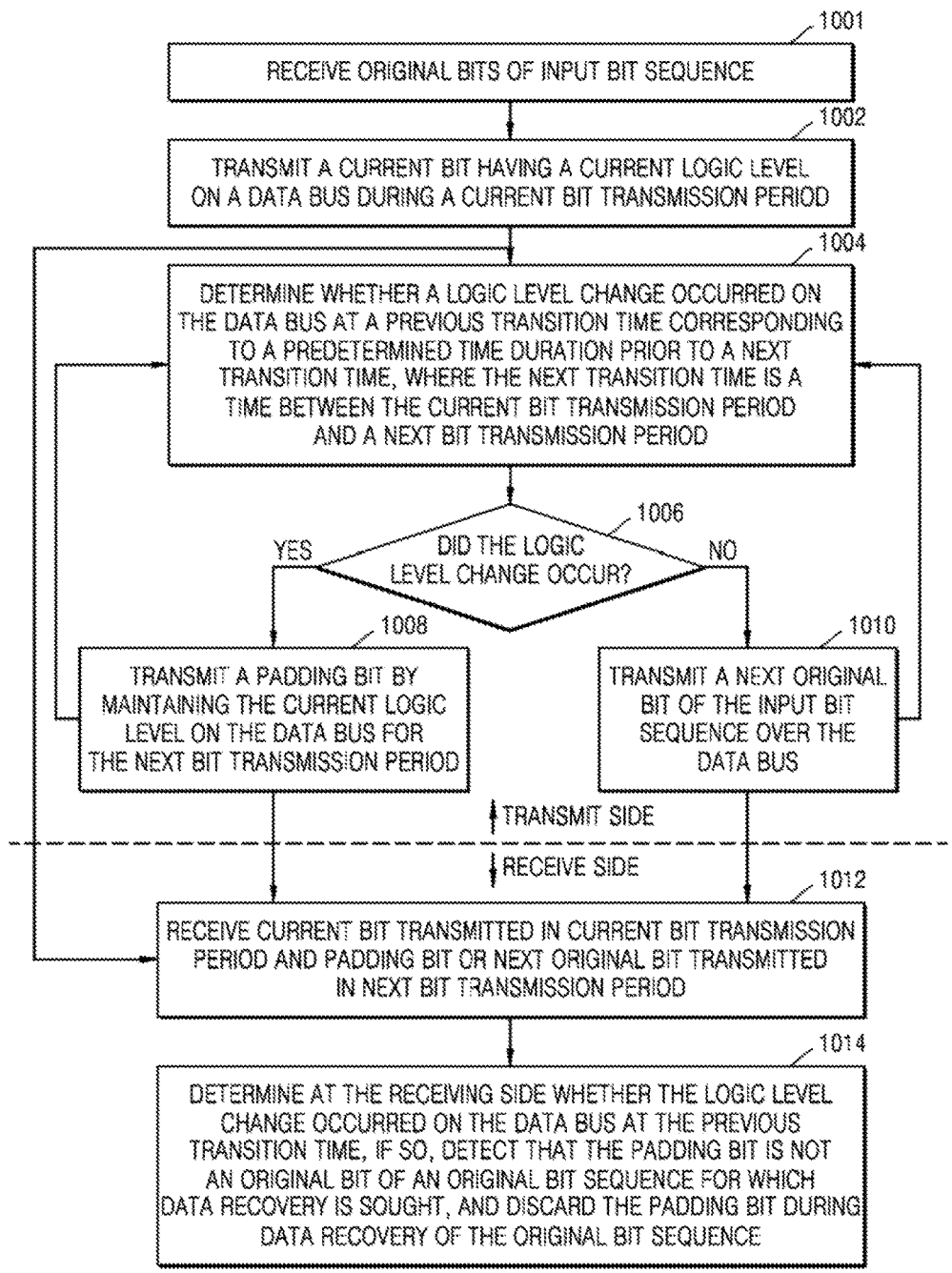

DIGITAL BUS NOISE SUPPRESSION

BACKGROUND

Technical Field

The present disclosure relates generally to technology for suppressing noise on a digital bus.

Discussion of the Related Art

Digital signaling is often used between integrated circuits (ICs) to transmit or receive data. A common technique to reduce pin count involves serializing data that is initially provided in parallel, and sending the serialized data over a digital bus at a high rate. The signaling representing the data consists of driving a line to one of two voltage levels. However, switching between the two levels at a high speed has the potential to cause electromagnetic interference (EMI) to RE circuitry in either of the two ICs (or indeed any other RE circuitry nearby), as the metal tracing of the digital bus between the two ICs can act as an unwanted antenna.

SUMMARY

At least one embodiment of the inventive concepts provides a data bus interface may include a history buffer and a serializer circuit. The history buffer may store bits representing a history of data recently transmitted on the data bus. The serializer circuit may be configured to modify an input bit sequence containing original bits by interspersing padding bits with the original bits to suppress noise at one or more target frequencies. The serializer may output the modified input bit sequence on the data bus. Each padding bit of the padding bits may be generated based on values of at least two bits stored in the history buffer.

In particular, the insertion of the padding bits may be designed to avoid the existence of bit transition edges (changes in logic levels) on the data bus at spacings that would otherwise produce unwanted noise at a certain frequency or frequencies.

According to an exemplary of the inventive concept, a data communication system may communicate an input bit sequence from a transmitting side to a receiving side over a data bus. The transmit side may include the above-noted history buffer and serializer circuit. A receive interface circuit on the receiving side may include: a receive history buffer configured to receive the modified input bit sequence over the data bus and store a number of recently received bits; and a data recovery circuit configured to receive the modified input bit sequence and discard padding bits responsive to commands generated based on values of at least two bits stored in the receive history buffer, and thereby recover the input bit sequence.

According to an exemplary of the inventive concept, a data communication method involves transmitting a current bit having a current logic level on a data bus during a current bit transmission period. A determination is made as to whether a logic level change occurred on the data bus at a previous transition time. The previous transition time corresponds to a predetermined time duration prior to a next transition time, where the next transition time is a time between the current bit transmission period and a next bit transmission period. If the logic level change occurred, a padding bit is transmitted by maintaining the current logic level on the data bus for the next bit transmission period.

According to an exemplary of the inventive concept, a data communication method involves transmitting a current bit at a current logic level on a data bus during a current bit transmission period. It is determined whether a first logic level change occurred on the data bus at a first predetermined time prior to the start of a next bit transmission period succeeding the current bit transmission period. It is further determined whether at least one second logic level change occurred on the data bus at at least one second predetermined time prior to the start of the next bit transmission period. If one or more of the first logic level change and the at least one second logic level change occurred, a padding bit is transmitted by maintaining the current logic level for the next bit transmission period. This method may serve to suppress noise in a first target frequency which is a function of the first predetermined time, and at least one second target frequency which is a function of the second predetermined time.

BRIEF DESCRIPTION OF THE DRAWINGS

Exemplary embodiment of the inventive concept will become more apparent from the following detailed description, taken in conjunction with the accompanying drawings in which like reference numerals indicate like elements or features, wherein:

FIG. 5B illustrates changes in data within a transmit buffer and a receive buffer according to an exemplary embodiment of the inventive concept;

FIG. 12 is a flow chart of an exemplary data communication method according to an exemplary embodiment of the inventive concept.

DETAILED DESCRIPTION

The following description, with reference to the accompanying drawings, is provided to assist in a comprehensive understanding of certain exemplary embodiments of the inventive concept disclosed herein for illustrative purposes. The description includes various specific details to assist a person of ordinary skill the art with understanding the claimed subject matter, but these details are to be regarded as merely illustrative. For the purposes of simplicity and clarity, descriptions of well-known functions and constructions may be omitted when their inclusion may obscure appreciation of the inventive concept by a person or ordinary skill in the art. In this document, the singular forms "a", "an" and "the" are intended to encompass the plural forms as well, unless the context clearly indicates otherwise.

Figure 1:
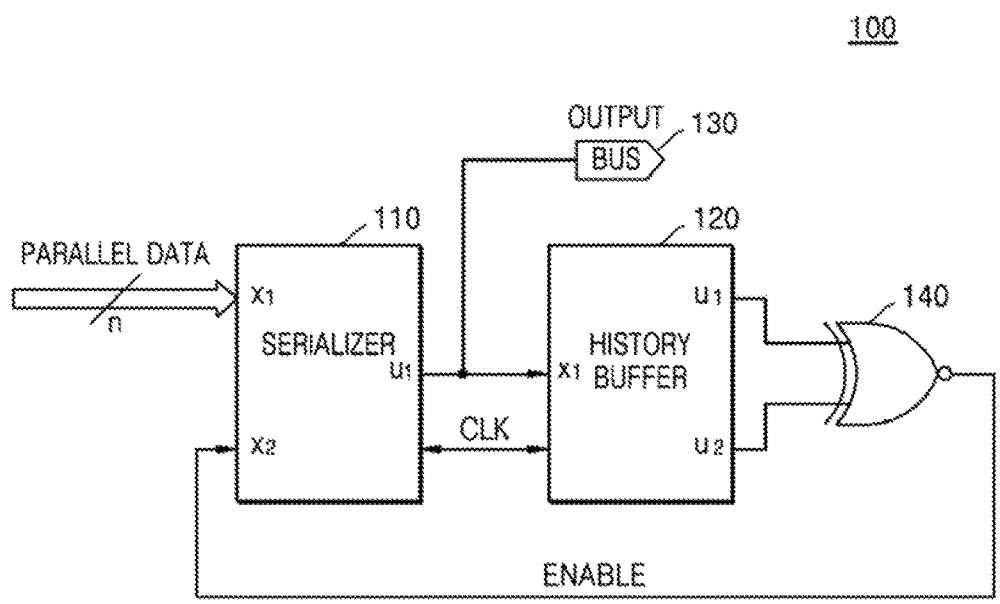
FIG. 1 is a block diagram of a noise suppression interface circuit on a transmit side of a data communication system, according to an exemplary embodiment of the inventive concept.

FIG. 1 is a block diagram of a noise suppression interface (IT) circuit 100, employed on a transmit side of a data communication system, according to an exemplary embodiment of the inventive concept. I/F circuit 100 includes a serializer circuit ("serializer") 110, a history buffer circuit ("history buffer") 120 and an XNOR gate 140 or equivalent logic circuit. Typically, serializer 110 receives parallel data from a processor, converts the parallel data to serial data and selectively adds padding bits to suppress bus noise otherwise caused by the serial data stream, as described in detail hereafter. The serial data stream may be synchronized with a faster clock than that controlling the parallel data, so as to maintain a data transmission rate comparable to that of the parallel data. As shown in the inter-chip data communication system of FIG. 2, I/F circuit 100 may be part of a first integrated circuit (IC) chip IC1 including a processor 202 that outputs original data to I/F circuit 100. I/F circuit 100 in turn serializes and outputs the data over a serial ("digital") data bus 130 to a second integrated circuit chip IC2. Integrated circuit IC2 has a complementary receive I/F circuit 200 that interfaces with bus 130, recovers the original data and provides the recovered data to a processor 204. In other environments, transmit I/F circuit 100 and receive I/F circuit 200 may be part of the same integrated circuit chip. For explanatory purposes below, data communication and noise reduction will be described in the context of unidirectional data flow along bus 130, but it is understood that the noise reduction technique may be applied to bi-directional data flow on bus 130. Note that serial bus 130 may be a single data line of a parallel bus carrying multiple data streams.

Figure 7:
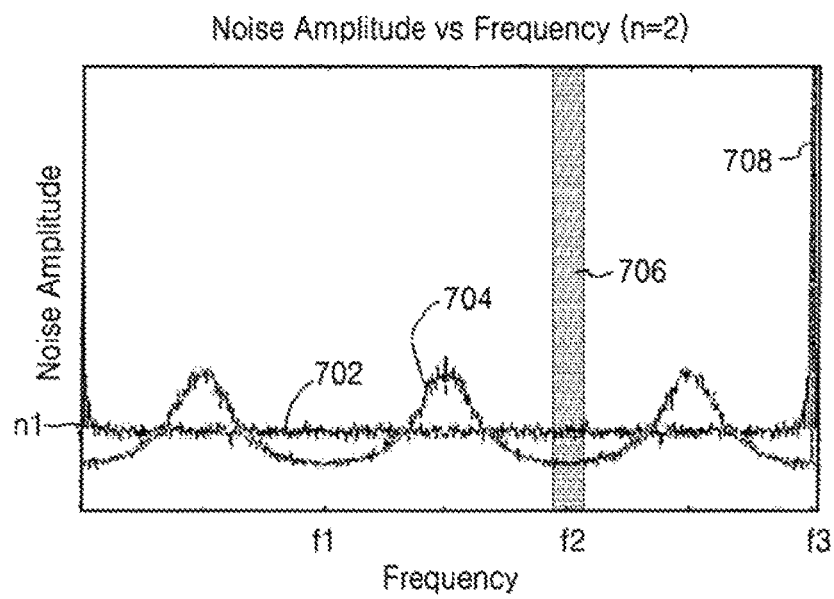
FIG. 7 is a graph showing simulated noise suppression results for a first example target frequency band according to an exemplary embodiment of the inventive concept.

Serializer 110 modifies the input data sequence applied to its input port x1 and outputs a modified data sequence at an output port u1 to data bus 130. The modified data sequence contains padding bits which are strategically added for the purpose of suppressing bus noise within a selected frequency band. More specifically, bus noise may be shifted from the selected frequency band to another band by selectively interspersing the padding bits with original bits of the input data sequence. That is, the RF spectrum of the noise may be shaped in such a way as to minimize it in a chosen band. Referring momentarily to FIG. 7 to illustrate this concept, a simulation example is shown in which random noise 702 is originally present at about the same level over a wide frequency range. If it is desired to lower the noise within a narrow band around 80 MHz, the noise pattern may be transformed by noise suppression I/F circuit 100 to a pattern 704 of peaks and valleys above and below the original level, with a valley at 80 MHz. For instance, a target band for noise suppression may be a band at which other circuit components are operating (e.g. an FM circuit operating at 80 MHz on one of the chips) whereas the existence of noise may be less important at frequencies corresponding to the resulting peaks in the noise pattern.

Serializer 110 may be configured as any suitable logic circuitry capable of inserting padding bits in a serial data stream responsive to a flow control signal (e.g. an Enable signal). Designs for such serializers are known to those skilled in the art and may include a multiplexer with a set of input lines for receiving parallel input data. At least one additional input line of the multiplexer may receive an output from a logic circuit providing additional bits—in some systems, these may be control bits for error correction, header bits of a packet, or control bits for synchronizing data flow on both sides of the communication link. The multiplexer may have at least one output line outputting a serial data stream containing the original bits of the parallel input data, interspersed with the additional bits. The serial data stream is synchronized with rising or falling edges of an input clock signal applied to the multiplexer.

History buffer 120 stores data bits of data that have been actually output to bus 130. A predefined check point between storage cells within the buffer is checked to ascertain whether an "edge" existed at a transition between previously transmitted bits. An "edge" exists between first and second successively transmitted bits if the bits differ in value, i.e., the first bit is a "0" and the second bit is a "1", or vice versa. On a serial bus line, an edge causes current to flow, thereby generating noise. If an edge coincides with at the predefined check point, then in the next bit transmission period (e.g., one clock cycle), instead of transmitting the next bit in the input data sequence, serializer 110 maintains the current level over the next bit transmission period. That is, a padding bit is output to the bus at the same level as the bit previously transmitted. This maintains the logic high or logic low voltage level on bus 130 at its current level for at least one more bit transmission period. The mechanism by which this technique shifts noise will be explained below. On the receive side, a receive I/F circuit 200 utilizes a complementary circuit scheme to discard the padding bits and recover the original data sequence.

Figure 3:
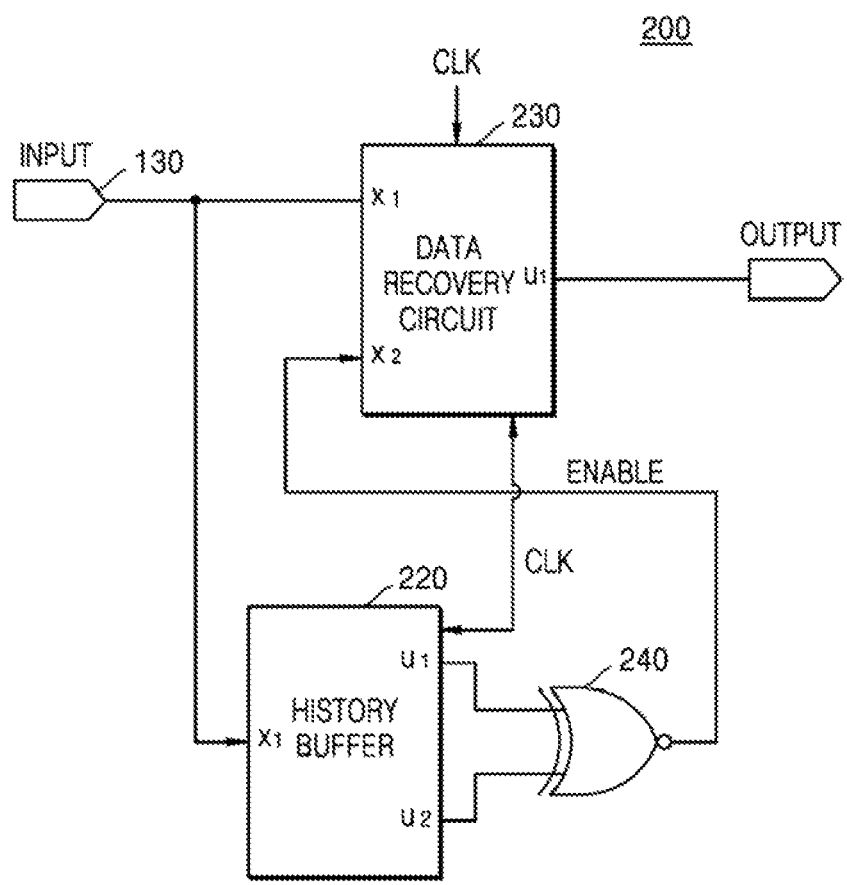
FIG. 3 is a block diagram of an interface circuit on a receive side of the data communication system according to an exemplary embodiment of the inventive concept.

FIG. 3 schematically depicts an exemplary embodiment of a receive interface circuit 200 utilized on a receive side of a data communication system. Receive I/F circuit 200 includes a data recovery circuit 230 that receives data on bus 130 transmitted from transmit I/F circuit 100; a history buffer 220; and an XNOR gate 240. Receive I/F circuit 200 operates in a manner complementary to transmit I/F circuit 100 to recover the original data stream, as will become apparent in the discussion below. Data recovery circuit 230 may, for example, be a deserializer with a complementary design as serializer 110.

The Enable command may be generated at a predetermined level (e.g. logic low) to insert or discard padding bits depending on past data transmitted over the bus. This, results in noise reduction at a frequency of ($B_{TF}/(N+1)$) and harmonics thereof, where: $B_{TF}$ is a bit transmission frequency equaling (1/bit transmission period); the Enable command represents the presence or absence of a change in bit values (the presence or absence of an "edge") at a transition time between N and (N+1) bit transmission periods prior to the current bit transmission period; and N is selected based on a desired frequency at which noise is to be reduced. In the examples given below, $B_{TF}$ will be assumed to be equal to a clock frequency $f_{CLK}$ between rising edges of a master clock. Alternatively, $B_{TF}$ may be set at twice the clock frequency (e.g. a bit transmission period may begin at each rising edge and each falling edge of a master clock); or, $B_{TF}$ may be set at fractions of the clock frequency $f_{CLK}$.

Figure 4:
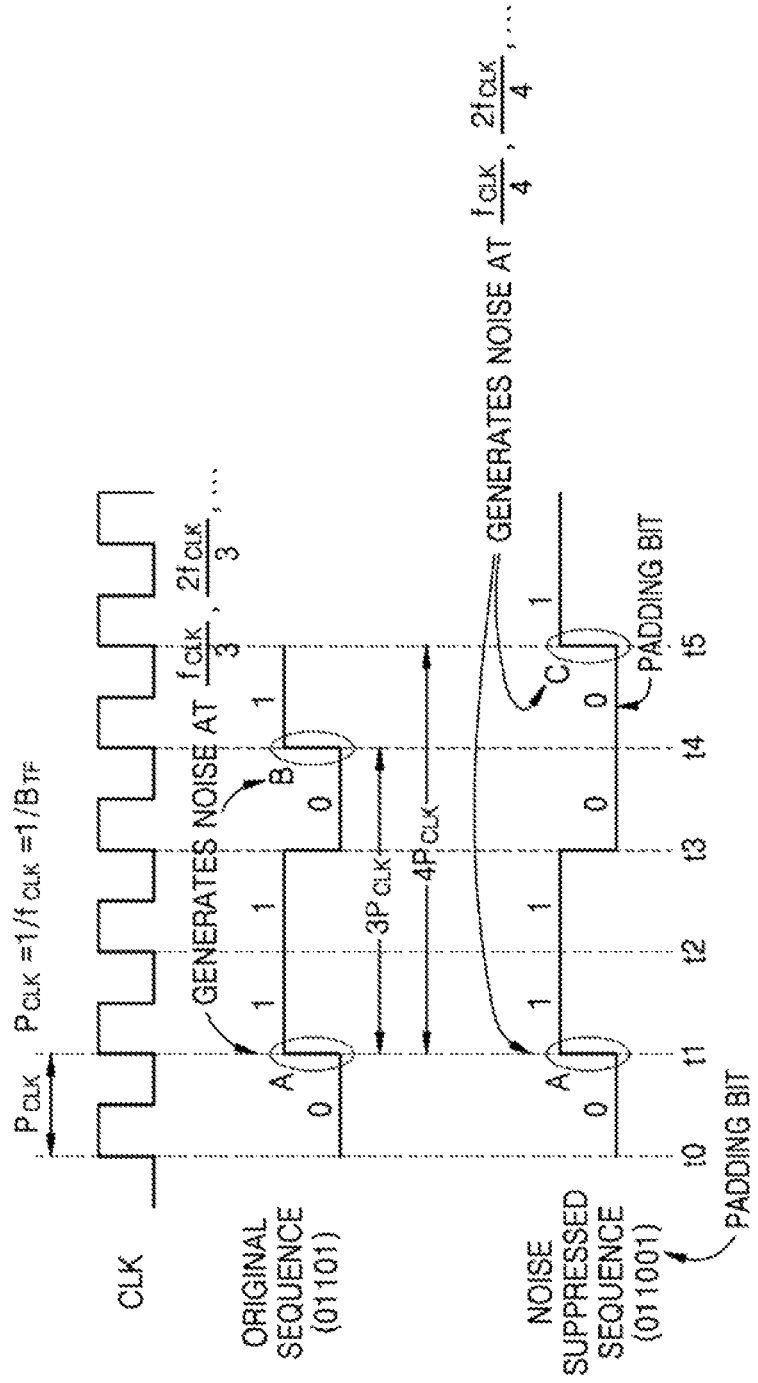
FIG. 4 is a signal diagram illustrating a noise suppression method using the interfaces according to an exemplary embodiment of the inventive concept.

FIG. 4 is a signal diagram illustrating a noise suppression method using interfaces 100 and 200 according to an exemplary embodiment of the inventive concept. The transmission and reception of data is synchronized using a master clock signal CLK provided at a frequency $f_{CLK}$, such that a clock period $p_{CLK}=(1/f_{CLK})$ separates rising edges of the clock signal. For illustrative purposes, assume it is desired to transmit an original sequence of 01101 on the serial bus line 130 to be recovered at a receiver, where each bit is represented by either a high (1) or low (0) voltage, e.g., 5V and 0V, respectively, on the bus. It is further assumed that the transition between bits occurs at rising clock edges, and the voltage level of each bit is maintained for one clock period $p_{CLK}$ (bit transmission period $B_{TP}=p_{CLK}$). Thus, if the original sequence is transmitted conventionally, the first bit 0 is transmitted between times t0 and t1, and at time t1, the bus voltage rises from the 0 level to the 1 level, generating an "edge" at "A". The succeeding bits 1, 1, 0, 1 are transmitted between times t1 to t4 spanning four clock periods $4p_{CLK}$. In this sequence, it is seen that the time interval between the (rising) edges A and B at times t1 and t4 is $3P_{CLK}$. These particular edges generate noise at each of a fundamental frequency ("first order harmonic") of $f_{CLK}/3$; a second order harmonic frequency $2f_{CLK}/3$; a third order harmonic $3f_{CLK}/3$; etc.

Suppose it is desired to suppress noise at either the first or second harmonic frequencies. If a padded bit of value 0 is added between times t4 and t5 to shift the edge out by one clock cycle, the time interval between the resulting edges A and C is extended to $4p_{CLK}$. These edges generate noise at a fundamental frequency $f_{CLK}/4$; at a second harmonic $2f_{CLK}/4$; at a third harmonic $3f_{CLK}/4$; etc, but no longer generate noise at $f_{CLK}/3$. The actual transmitted sequence would then be changed to 011001. On the transmit side, transmit I/F circuit 100 may always add a padded bit in this manner to suppress the noise at the original frequencies $f_{CLK}/3$, etc. The process may be repeated continually so that edges are always avoided on the bus at spacings of $3p_{CLK}$ and noise at the target frequency is continually suppressed. On the receive side, in order to recover the original data sequence, receiver I/F circuit 200 employs a scheme that detects and discards the padding bits, as will be explained.

Figure 5A:
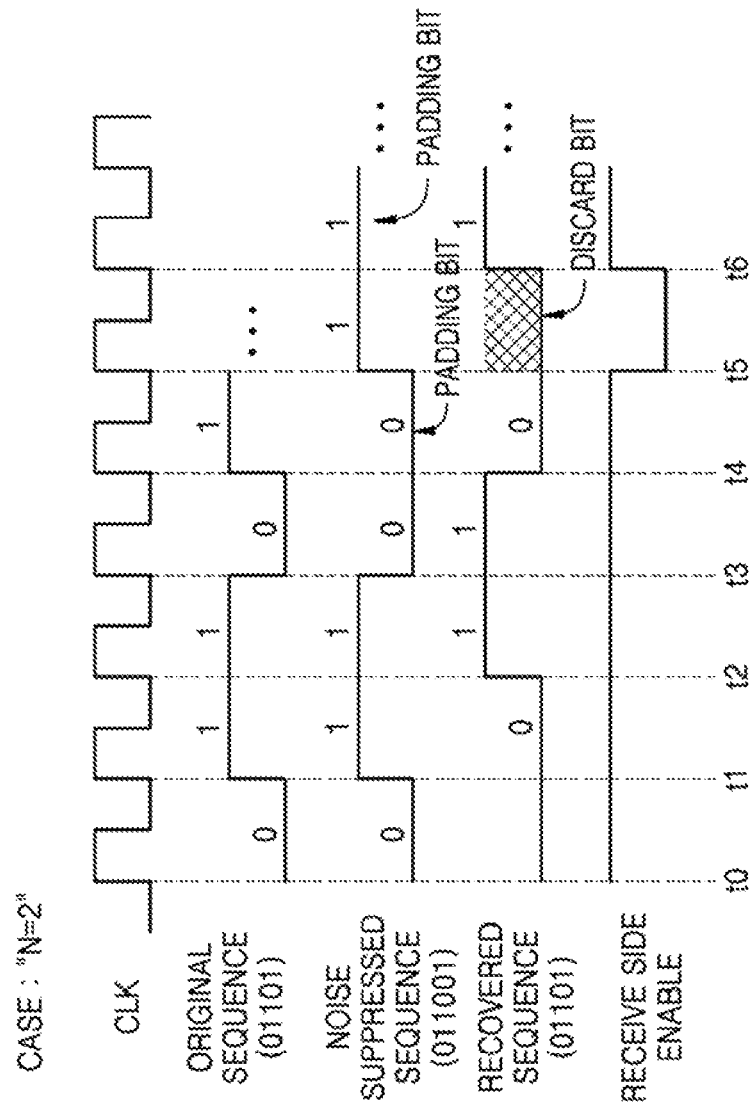
FIG. 5A is a signal diagram illustrating how a data sequence to be transmitted may be modified by the interface and how data may be recovered by the interface according to an exemplary embodiment of the inventive concept.

FIG. 5A is a signal diagram illustrating how a data sequence to be transmitted by I/F circuit 100 on bus 130 may be modified for noise suppression, and how data is recovered by receive I/F circuit 200. FIG. 5B illustrates changes in data within transmit side history buffer 120 and receive side history buffer 220, corresponding to the example of FIG. 5A. To illustrate the inventive concept, an example is given of a clock frequency at 120 MHz and an original data sequence of 01101 (the same as in FIG. 4). Assume that I/F circuit 100 is configured to suppress "fundamental frequency" noise at 40 MHz and "$2^{nd}$ harmonic noise" at 80 MHz, which would be otherwise generated on the bus conventionally. These objectives may be realized by setting "N=2", where N represents a transition location between buffer storage cells storing bits that were successively transmitted previously between N and (N+1) bit transmission periods preceding the current bit transmission period. As seen in FIGS. 5A and 5B, the transmit history buffer 120 and receive history buffer 220 are each assumed to have at least five storage cells #0 to #4, and all cells are initialized to store "0" (logic low) levels prior to storing real data, just prior to time t0. Also, just prior to time t0, the bus 130 voltage level is set at the buffer initialization level, e.g., at 0V corresponding to the bits at "0". (Alternatively, they may be initialized at "1" levels and the bus 130 voltage set at logic high.) Cell #0 represents the data transmitted in the immediately previous clock cycle. N=2 corresponds to the transition location between cells #2 and #3, representing data that was transmitted between 3 and 4 clock cycles ago. As noted earlier, in these examples, the bit transmission period $B_{TP}=p_{CLK}$, but other timing arrangements are also contemplated.

Since N=2, three initial bits are first transmitted prior to the first "edge" detection (and padding bit decision), since the buffers should be first populated with bits representing actually transmitted data prior to the first edge detection. Thus, at time t0, the first bit "0" of the sequence is both transmitted over bus 130 (the bus 130 voltage remains at a logic low) and the first bit "0" is loaded into the first cell #0 of transmit buffer 120. Assuming a one clock cycle delay between transmit and receive data processing, at time t1, the first bit "0" sent over bus 130 is loaded into cell #0 of the receive buffer 220. Also at time t1, in the transmit buffer 120, the first bit "0" shifts to the second cell #1 and the second bit "1" is stored within cell #0; and the second bit "1" is sent over the bus. At time t2, the third bit "1" of the sequence is loaded into cell #0 of transmit buffer 120 and the second bit "1" is loaded into cell #0 of the receive buffer 220, while the other bits shift over by one cell.

Between times t2 and t3, a transition check point between cells #2 and #3 (corresponding to "N=2") is checked to determine whether an edge was transmitted on the bus three bit transmission periods prior to the next transmission, i.e., whether an edge was transmitted at time t0. In the example, no edge was transmitted since cell #2 stores "0" and cell #3 also stores "0". As a result, at time t3 the next original bit, which is "0", is transmitted and also stored in cell #0 while the other bits shift within the buffers' cells. However, between times t3 and t4 the check is repeated and reveals that an edge was indeed transmitted since cell #2 stores "1" and cell #3 stores "0", indicating that the bus voltage changed from logic low to logic high at time t1. Therefore, serializer 110 receives the Enable command signal from transmit buffer 120 at a level (e.g., logic low) instructing serializer 110 to maintain the current logic level on bus 130 for one additional clock cycle, thereby effectively placing a padding bit of "0" on the bus 130 at time t4. This padding bit is also stored in cell #0 at time t4. Meanwhile, at time t3 the receive buffer 220 stores the previously transmitted bit "1" in its cell #0, such that receive buffer 220 has its first three cells populated with data. Between times t3 and t4, a first edge check is performed at the receive buffer 220 between its cells #2 and #3 but no edge is detected. Therefore, the receive buffer 220 assumes the next transmitted bit at time t4, i.e., "0", was an original bit and should be recovered.

Next, at time t5, the next original bit "1" is placed in cell #0 of transmit buffer 120 because there was no edge detected between cells #2 and #3 (they were both at "1"). The noise suppressed sequence sent on the bus is thus 011001. Between times t4 and t5, receive buffer 220 makes its second check between its own #2 and #3 cells and determines that an edge was transmitted. Since an edge was indeed transmitted, receive buffer 220 changes the state of an "Enable" command sent to data recovery circuit 230, to logic low, whereby the next received bit, i.e., "0" at time t5, is discarded. This is seen in the recovered data sequence diagram of FIG. 5A. The recovered sequence thereby becomes 01101.

For some data sequences, two consecutive padding bits may be variously inserted to achieve a target noise reduction. For instance, in the same example just discussed, i.e., when desired to shift 40 MHz spaced noise to 30 MHz spaced noise (such that N=2), an input sequence of 01001 would result in a noise suppressed sequence of 0100001. This is because the rising edge of the second "1" is originally spaced three clock cycles from the rising edge of the first "1". As such, a first padding bit "0" is inserted after the third "0" to shift this rising edge four clock cycles away. However, after the first padding bit "0" is inserted, the rising edge of the second "1" is spaced three clock cycles from the falling edge of the first "1", such that a second padding bit "0" may be inserted to push this spacing to four clock cycles. In an alternative embodiment, logic circuitry is configured so that consecutive padding bits are avoided, to thereby limit the number of additionally transmitted bits (thus limiting "signaling overhead" but at the expense of some noise reduction).

In the example embodiments of FIGS. 1-5B, an XNOR gate (or equivalent XNOR gate such as an XOR gate followed by an inverter) could be used on both the transmit and receive sides to output an Enable command to serializer 110 and data recovery circuit 210. Returning to FIG. 1, port x1 of history buffer 120 represents an input data port, and ports u1 and u2 represent output ports providing the current logic levels of cells #2 and #3, respectively (for the case of N=2). Thus, when u1≠u2, an Enable signal at the output of XNOR gate 140 is set to a first level (low), which instructs serializer 110 to maintain the current bus level for the next bit transmission period, i.e., inserting a padding bit. When u1=u2, the Enable signal is set to a second level (high), representing a command to send the next bit on the bus at its actual data value. Similarly, on the receive side, the output of XNOR gate 240 is low when the u1 and u2 output ports of history buffer 220 (representing the bit values of cells #2 and #3 of buffer 220) have unequal logic levels, as seen in FIG. 5A between times t4 and t5. In this case, the next bit received is discarded. On the other hand, when u1=u2, the next bit is recovered as real data of the receive data sequence.

Figure 6:
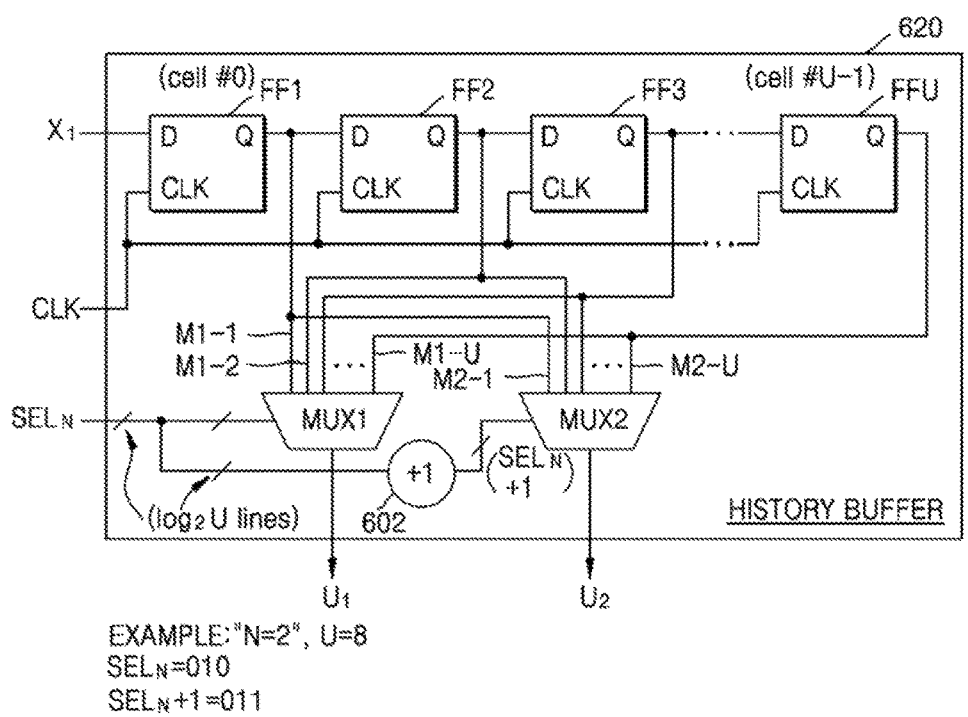
FIG. 6 is a schematic diagram of an example history buffer circuit according to an exemplary embodiment of the inventive concept.

FIG. 6 schematically illustrates an exemplary embodiment of a history buffer circuit that may be used for either of history buffers 120, 220. History buffer 620 is a circuit including a series of U flip flops FF1-FFU (exemplified as D flip flops) or latches arranged as a shift register, a pair of multiplexers MUX1, MUX2, and an "add 1" logic circuit 602. Each flip flop FF1-FFU may effectively form one of the storage cells of the history buffer, in this case cell #0 to cell # (U−1). The input data bit to history buffer 620 received at input port x1 is applied to the D input (data input port) of flip flop FF1, and each flip flop shifts the input at its D port to the output Q port (latched output port) every clock cycle of the clock signal CLK applied to each flip flop's clock input. The Q outputs of each of flip flops FF1-FFU are connected to each of respective input lines M1-1 to M1-U of multiplexer MUX1, and also to each of input lines M1-1 to M2-U, respectively, of multiplexer MUX2.

A control signal $SEL_N$ applied across $\log_2 U$ parallel lines (width=$\log_2 U$ lines) is applied to control inputs of multiplexer MUX1 to select data on one of the input lines M1-1 to M1-U to be transferred to the first output port $U_1$ connected to the MUX1 output. Thus, control signal $SEL_N$ effectively selects the "N" and "N+1" cells of history buffer 620 from which to output, which controls the noise suppression frequencies as described earlier. Control signal $SEL_N$ may be generated by a processor (e.g. 202 or 204 of FIG. 2) executing a software program, so as to dynamically select the target frequency of noise suppression (e.g. under the control of a user or responsive to environmental noise conditions). Control signal $SEL_N$ is also applied as an input to the add 1 circuit 602, where the output of add 1 circuit 602 is applied to multiplexer MUX2 to select the "N+1" cell.

For example, in the case of U=8, $\log_2 U$=3 and the $SEL_N$ signal is applied over 3 parallel input lines to 3 control lines of multiplexer MUX1. If the target frequency of noise suppression is 80 MHz ($2^{nd}$ harmonic of 40 MHz) as in the example of FIGS. 5A-5B, the $SEL_N$ signal may have a value of 010. This selects the input line M1-3, which carries a voltage of the Q output of flip flop FF3 (cell #2). The add 1 circuit 602 would then have an output signal ($SEL_N$+1) of 011 across 3 output lines thereof, which serves to select the input line M2-3 carrying the output of cell #3 to the second output port $U_2$.

FIG. 7 is a graph showing simulated noise suppression results according to an exemplary embodiment of the inventive concept for a first example target noise suppression frequency band. This case assumes a clock cycle frequency $f_{CLK}$ of f3, and a bit transmission frequency $B_{TF}$=$f_{CLK}$, which produces a noise spike 708 at f3. Without implementing the exemplary embodiments of the inventive concept, random noise 702 would be generated over bus 130 at a relatively constant level (normalized amplitude level of n1) over a wide frequency range. For a history buffer design "N=2" as discussed in the example of FIGS. 5A and 5B, noise at a fundamental frequency (first order harmonic) of f1 and also at a $2^{nd}$ order harmonic of f2 is suppressed. More specifically, noise is avoided at a frequency of f1 due to the continual avoidance of edges that would otherwise be separated by a period of three clock cycles. Thus, if it is desired to lower the noise within a narrow band 706 around 80 MHz, the noise pattern may be transformed to the pattern 704 by noise suppression I/F circuit 100 to one of peaks and valleys above and below the original level. For instance, a target band for noise suppression may be a band at which other circuit components are operating (e.g. an FM circuit operating at f2 on one of the chips), whereas the existence of noise may be less important at frequencies corresponding to the resulting peaks in the noise pattern.

Figure 8:
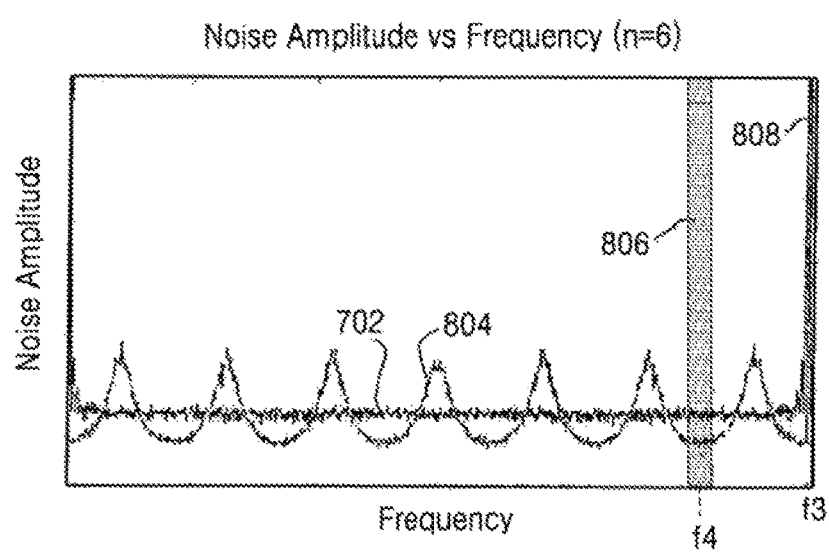
FIG. 8 is a graph showing simulated noise suppression results for a second example target frequency band according to an exemplary embodiment of the inventive concept.

FIG. 8 is a graph showing simulated noise suppression results according to an exemplary embodiment of the inventive concept for a second target frequency band. In this example, "N=6" which means that each history buffer 120 and 220 provides the Enable output corresponding to the transition between cells #6 and #7. Thus, history buffers 120 and 220 may each be designed with at least seven cells. These transition points correspond to previously transmitted bits seven bit transmission periods previous to the current one (equaling seven previous clock cycles in this example). Thus, at a clock frequency of f3, noise is avoided at f3/7, and the higher order harmonics. Assuming it is desired to reduce noise at the $6^{th}$ order harmonic, the simulated noise pattern 804 shows a reduction in noise over a narrow band 806 around f4. A noise spike 808 still occurs at f3.

Figure 9:
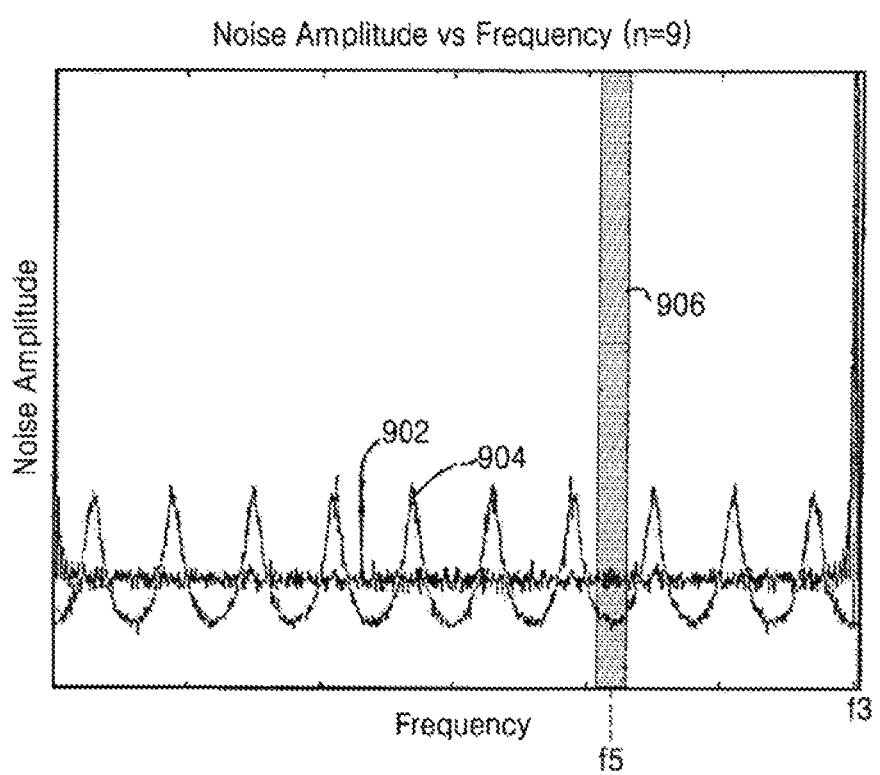
FIG. 9 is a graph showing simulated noise suppression results for a third example target frequency band according to an exemplary embodiment of the inventive concept.

FIG. 9 provides another simulation according to an exemplary embodiment of the inventive concept for a data communication system configured to suppress noise at another target frequency band(s). In this case, "N=9", $B_{TF}$=$f_{CLK}$=f3, and history buffers 120 and 220 are provided with at least 10 cells each. It is desired to suppress noise at a fundamental frequency of f3/10, and at higher order harmonics. A noise suppression pattern 904 is thereby produced with a noise suppression band 906 centered around f5, i.e., the $7^{th}$ order harmonic.

In the above-described embodiments, the history buffers 120, 220 are described as outputting the Enable command for inserting or discarding bits to prevent the transmission of edges separated by (N+1) bit transmission periods, so as to reduce noise at a frequency of ($B_{TF}$/(N+1)) and harmonics thereof. As explained, this is done by performing a check for an "edge" at a single position of the history buffer, e.g., checking the difference in bit values between two adjacent cells in each history buffer. Note that this is not the same as increasing power consumption since (on average) the same amount of edge transitions will occur. In an alternative embodiment, for each bit transmission period, a check may be performed at two or more points in each history buffer for the purpose of suppressing noise at two or more fundamental frequencies and their harmonics. Thus, further selectivity in noise suppression is possible with this approach, but at the expense of extra signaling overhead (still more padding bits).

By way of example, suppose it is desired to transmit bits at a clock frequency of 120 MHz as in the above examples of FIGS. 8 and 9, but to suppress noise at both fundamental frequencies. In this case, history buffers 140 and 240 may each be configured with at least seven cells, cell #0 to cell #6, and transition points of "N=2" and "N=6" are checked for every bit transmission period. Logic circuitry may be added that results in outputting, for every bit transmission period, the Enable signal at logic low if either one of the two transition points corresponds to an "edge". Hence, noise would be suppressed at two fundamental frequencies and their harmonics, but the total amount of signaling overhead would increase to approximately 100%. That is, the number of padding bits may approximately equal the number of original bits. To implement this technique using hardware, a modified design for history buffer 620 of FIG. 6 may be used for history buffers 120, 220 by adding another set of multiplexers, i.e., third and fourth multiplexers, and a second add 1 circuit. A second $SEL_N$ signal may be applied to each of the third multiplexer and the add 1 circuit, with a different "N" value selecting a second transition point. Some or all of the Q output ports of the flip flops FF1-FFU may be connected to input lines of the third and fourth multiplexers in the same or similar manner as for the first and second multiplexers. Thus, the third and fourth multiplexers may provide third and fourth outputs representing a second edge detection result at the second transition point. The third and fourth outputs may be input to a second NAND gate 140. Output signals of the two NAND gates 140 may then be applied as inputs to an OR gate, and the output of the OR gate may server as the Enable signal applied to the serializer 110 and/or data recovery circuit 230.

In any of the above-discussed embodiments, if it is desired to maintain an original data transmission rate ("data bandwidth") above a certain level, the clock rate may be increased if the communication system allows for it. For instance, if desired to suppress noise at 80 MHz in the case of an original 120 MHz clock rate, the clock rate may be increased to 240 MHz, and 80 MHz noise would be suppressed for the case of "N=2". In this scenario, the overall data rate may meet a target despite the increase in signaling overhead by inserting the padding bits. In this example, 80 MHz would represent the fundamental frequency noise suppression rather than the $2^{nd}$ order harmonic noise suppression.

Figure 10A:
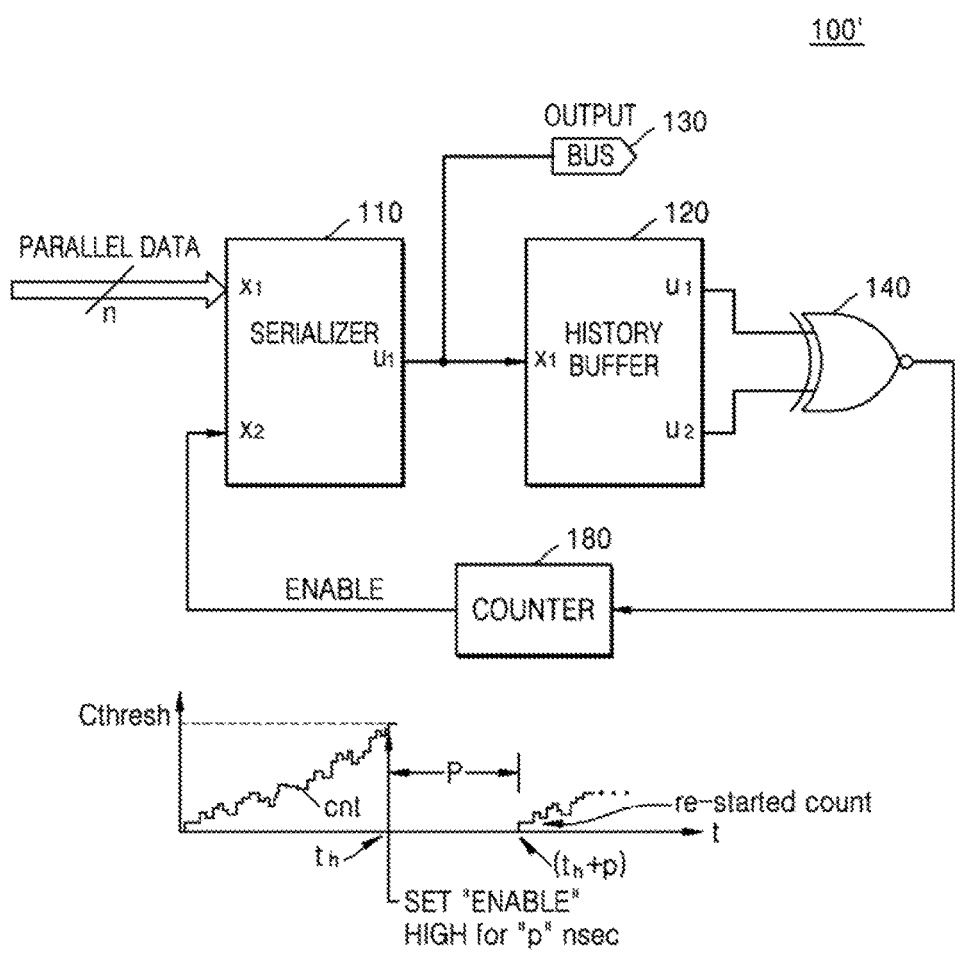
FIG. 10A illustrates an alternative embodiment of a transmit side noise suppression interface according to an exemplary embodiment of the inventive concept.

FIG. 10A illustrates a transmit side noise suppression interface circuit 100' according to an exemplary embodiment of the inventive concept. Interface circuit 100' differs from interface circuit 100 described above by including a counter 180 to count the number of padding bits that have been inserted, and to modify the Enable signal accordingly for reducing the number of padding bits. Hence the purpose of counter 180 is to reduce signaling overhead associated with the padding bits. For instance, in the cases described above, 50% or 100% signaling overhead may be considered too high of a temporal limit for a particular application. Signaling overhead may be reduced by intermittently suspending the addition of padding bits. To reduce signaling overhead, counter 180 may increment a count cnt for every edge detected by history buffer 120, by counting the occurrences of logic lows output from XNOR gate 140. Counter 180 may also be configured to decrement the count cnt every "K" clock cycles, where a value for K may be set by a designer in consideration of maximum signaling overhead, minimum signaling rate, and noise reduction objectives. When the count reaches a predefined threshold Cthresh (illustrated at a time $t_h$), then counter 180 may suspend the reporting of edges to port x2 of serializer 110 for a predetermined period of time P. The reporting of edges may be suspended by counter 180 just setting the Enable signal to a logic high for P nsec. At time ($t_h$+P), the count may be re-started and the process repeated.

Figure 10B:
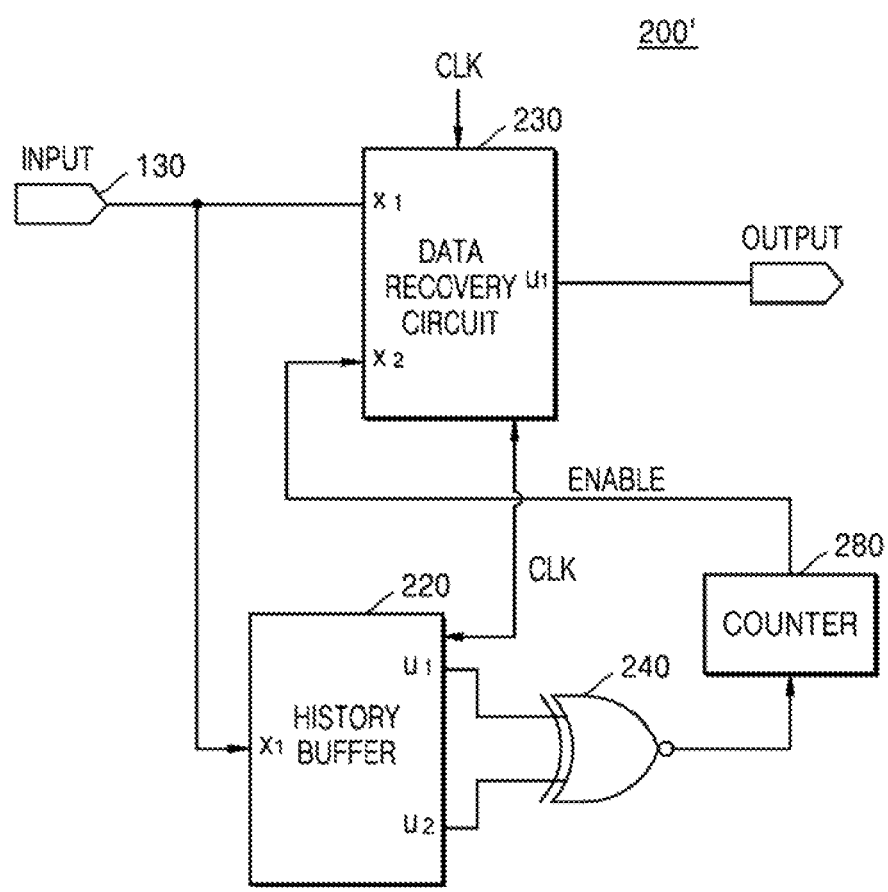
FIG. 10B illustrates an alternative embodiment of a receive side data bus interface according to an exemplary embodiment of the inventive concept.

FIG. 10B illustrates a complementary configuration for a receive interface according to an exemplary embodiment of the inventive concept. In an embodiment, a receive interface circuit 200' may be used with the transmit side noise suppression interface circuit 100' of FIG. 10A. On the receive side of the data communication system, a receive interface circuit 200' may be the same as interface circuit 200 except for the inclusion of a counter 280 which operates in a complementary fashion to counter 180, and synchronized with counter 180. When the count by counter 280 reaches the same predetermined threshold Cthresh, counter 280 likewise sets the Enable signal output to data recovery circuit 230 to a logic high for P nsec, thereby suspending discarding of bits for P nsec. Consequently, data recovery circuit 230 correctly recovers the original data sequence. Thereafter, the count is re-started, and padding bits are detected and discarded as described for the embodiments of FIGS. 1-3, until the count again reaches Cthresh and the process is repeated.

Figure 11:
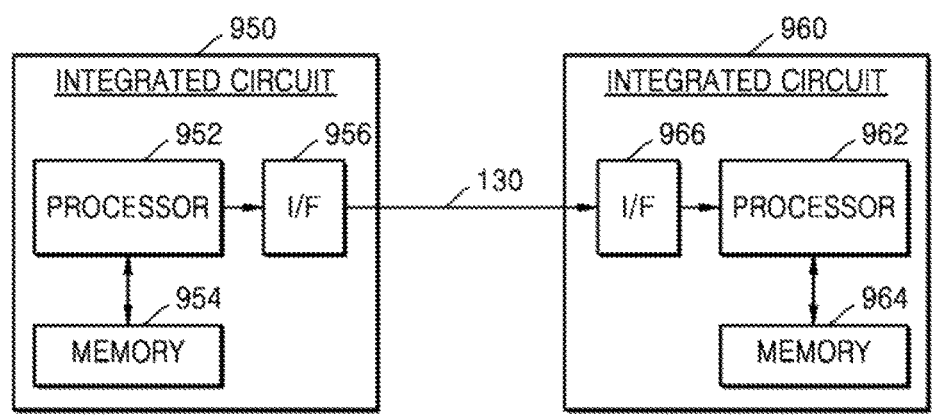
FIG. 11 depicts an alternative embodiment of an inter-chip data communication system according to an exemplary embodiment of the inventive concept.

FIG. 11 depicts an inter-chip data communication system according to an exemplary embodiment of the inventive concept. A transmitting integrated circuit (IC) 950 may include a processor 952, a memory 954 and a data bus I/F 956 that outputs data to data bus 130. Unlike serializer 110 of FIGS. 1-2, data bus I/F may be a conventional serializer that just serializes parallel data received from processor 952, without adding padding bits for noise reduction, and outputs the serialized data onto data bus 130. (Depending on the application, the data may be serialized "as is", or, there may be some additional control bits added by I/F 956.) Processor 952 generates or receives original bits to be transmitted, and executes software instructions read from memory 954 to add padding bits interspersed with the original bits. The padding bits may be added to achieve data bus noise reduction at a desired frequency or frequencies, in an analogous manner as is done by the circuitry of FIGS. 1-3 described above. Thus, processor 952 may use storage locations of memory 954 as a history buffer analogous to history buffer 120, which stores a history of bits actually transmitted on data bus 130. Processor 952 executes an algorithm to determine when padding bits should be interspersed with original bits. Similarly, a receive side integrated circuit 960 may include an I/F 966 which may be a conventional deserializer; a processor 962, and a memory 964. Unlike data recovery circuit 230, I/F 966 may provide deserialized data "as is" to processor 962, without detecting and discarding padding bits. Processor 962 executes software instructions read from memory 964, and uses storage locations in memory 964 as a history buffer analogous to history buffer 220, to detect and discard the transmitted padding bits.

Thus, IC's 950, 960 may include general purpose processors 952, 962 and conventional data bus I/F's 956, 966 to execute a noise reduction method, where processors 952, 962 execute complementary algorithms to generate (on transmit) and discard (on receive) the padding bits. It should be noted, if I/F 956 is configured to add bits (signaling overhead) for other purposes such as frame buffering, some of the noise reduction benefits of the scheme will be lost. That is, edges on the data bus would be transmitted by these additional bits without consideration for spacings between edges.

Figure 2:
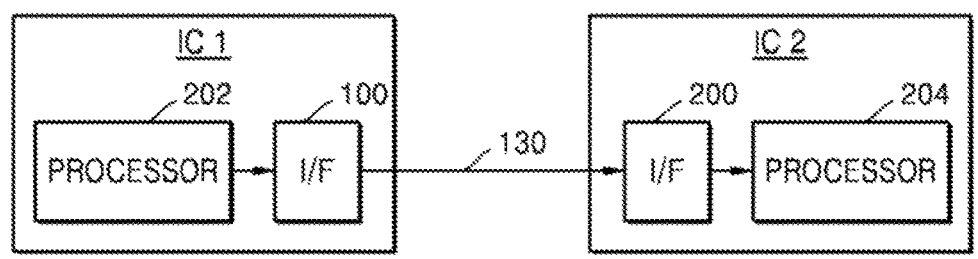
FIG. 2 illustrates an inter-chip data communication system according to an exemplary embodiment of the inventive concept.

In still another alternative embodiment of a data communication system, the hardware configuration of IC1 of FIG. 2 may be used for the transmit integrated circuit, while that of IC 960 may be used on the receive side. Similarly, IC 950 may be used on the transmit side while the configuration of IC2 of FIG. 2 may be utilized on the receive side.

FIG. 12 is a flow chart of an exemplary data communication method 1000 according to an exemplary embodiment of the inventive concept. Method 1000 may be performed using the transmit I/F circuit 100 and receive I/F circuit 200 of FIGS. 1-3. Alternatively, method 1000 may be performed by processors (e.g., processors 952, 962 of FIG. 11) executing software instructions, and using conventional transmit and receive interfaces (e.g. 956, 966) in place of I/F's 100 and 200. In either of these implementations of the method, original bits of an input bit sequence are first received 1001 at the transmit interface, and one or more original bits may be initially transmitted in an initialization step. (For example, a predetermined number of cells in the history buffers may be populated initially.) After such initialization, the transmit I/F transmits 1002 a current bit having a current logic level on data bus 130 during a current bit transmission period. XNOR gate 140 or processor 952 then determines 1004 whether a logic level change occurred on the data bus at a previous transition time(s) corresponding to a predetermined time duration(s) prior to a next transition time (i.e., detecting whether an "edge" was transmitted at the previous transition time(s)). (As discussed above, there may be two or more transition points to be checked for edges if desired to suppress noise at two or more fundamental frequencies.) The next transition time is a time in between the current bit transmission period and a next bit transmission period. At 1006, if the logic level change occurred, a padding bit is transmitted 1008 by means of the transmit I/F maintaining the current logic level on data bus 130 for the next bit transmission period. If the logic level change did not occur at 1006, a next original bit of the input bit sequence is transmitted over data bus 130 in the next bit transmission period. On the transmit side, the flow then returns to block 1004 where another edge detection is performed (here, the "current bit transmission period" becomes the period in which either the padding bit is transmitted 1008 or the next original bit is transmitted 1010). Thus, after the next determination at block 1004, it is possible for another padding bit to be transmitted, whereby two consecutive padding bits may be transmitted as discussed earlier. Otherwise, the next original bit is transmitted 1010 and the operations are repeated.

At the receive I/F, data recovery circuit 210 or I/F 966 receives the current bit, which was transmitted in the current bit transmission period, and receives the padding bit or the next original bit that was transmitted in the next bit transmission period. XNOR gate 240 or processor 962 then determines 1014 whether the logic level change occurred on data bus 130 at the previous transition time. If so, it is detected at 1014 that the padding bit is not an original bit of an original bit sequence for which data recovery is sought, and discards the padding bit during data recovery of the original bit sequence.

If noise reduction is desired at multiple target frequencies, the operation at block 1004 may be modified by making the logic level change determination at two or more previous transition times corresponding to the target frequencies, respectively. In this case, if a logic level change occurred at either one of the previous transition times, then a padding bit may be transmitted next at block 1008.

In data communication method 1000, the transmitted current bit may be one of an original bit of an input bit sequence, or another padding bit. As explained in the signal diagrams above, the determining of whether a logic level change occurred may include maintaining the transmit side history buffer 120 having Nth and (N+1)st storage cells storing Nth and (N+1)st bits, representing bits previously transmitted on the data bus 130 before and after the previous transition time, respectively, where N is an integer; and determining whether the logic values of the Nth and (N+1)st bits differ, where a difference there between coincides with a logic level change. Method 1000 may further include, when the padding bit is transmitted, updating the transmit side history buffer by: i) storing a logic value corresponding to the padding bit in a first storage cell of the transmit side history buffer; ii) shifting the Nth bit to the (N+1)st cell; and iii) repeating the determination of whether a logic level change occurred on data bus 130.

The padding bit discussed in method 1000 may be one of a plurality of padding bits that are transmitted interspersed with original bits of an original bit sequence, where each of the padding bits and the original bits are transmitted within a respective one of periodic bit transmission periods. The padding bits are inserted at times sufficient to suppress bus noise at a target frequency band which is a based on the predetermined time duration. The periodic bit transmission periods may be synchronized with a clock signal supplied to the interfaces 100 and 200. Each bit transmission period may have a duration equaling one clock cycle of the clock signal.

Exemplary embodiments of the inventive concept are described herein with reference to signal arrows and block diagrams and algorithmic expressions. Each block of the block diagrams, and combinations of blocks in the block diagrams, and operations according to the algorithmic expressions may be implemented by hardware accompanied by computer program instructions. Such computer program instructions may be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block/schematic diagram.

The term "processor" as used herein is intended to include any processing device, such as, for example, one that includes a central processing unit (CPU) and/or other processing circuitry (e.g., digital signal processor (DSP), microprocessor, etc.). Moreover, the term "processor" may refer to a multi-core processor that contains multiple processing cores in a computing device, and that various elements associated with a processing device may be shared by other processing devices.

The above-described methods according to the exemplary embodiments of the inventive concept can be implemented in hardware, firmware or via the use of software or computer code that can be stored in a recording medium such as a CD ROM, RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer or processor, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing described herein.

While the disclosure described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. A data bus interface comprising:
a history buffer configured to store bits representing a history of data recently transmitted on a data bus; and
a serializer circuit configured to modify an input bit sequence containing original bits by interspersing a plurality of padding bits with the original bits to suppress noise at one or more target frequencies, and to output the modified input bit sequence on the data bus, wherein each padding bit of the plurality of padding bits is generated based on values of at least two bits stored in the history buffer.

2. A data communication system for communicating an input bit sequence from a transmitting side to a receiving side over a data bus, the data communication system comprising:
a transmit interface circuit on the transmitting side, comprising:
a transmit history buffer configured to store bits representing a history of data recently transmitted on a data bus; and
a serializer circuit configured to modify an input bit sequence containing original bits by interspersing a plurality of padding bits with the original bits to suppress noise at one or more target frequencies, and to output the modified input bit sequence on the data bus, wherein each padding bit of the plurality of padding bits is generated based on values of at least two bits stored in the history buffer; and
a receive interface circuit on the receiving side, comprising:
a receive history buffer configured to receive the modified input bit sequence over the data bus and store a number of recently received bits; and
a data recovery circuit configured to receive the modified input bit sequence and discard padding bits responsive to commands generated based on values of at least two bits stored in the receive history buffer, and thereby recover the input bit sequence.

3. A non-transitory computer-readable storage medium having stored therein program instructions, which when executed by a processor, implement a data communication method comprising:
transmitting data on a data bus;
storing, in a history buffer, bits representing a history of the data that was recently transmitted on the data bus;
generating a plurality of padding bits, each being generated based on values of at least two bits stored in the history buffer;
modifying an input bit sequence containing original bits by interspersing the plurality of padding bits with the original bits to suppress noise at one or more target frequencies; and
transmitting the modified input bit sequence on the data bus.

4. A data communication method comprising:
transmitting data on a data bus;
storing, in a history buffer, bits representing a history of the data that was recently transmitted on the data bus;
generating a plurality of padding bits, each being generated based on values of at least two bits stored in the history buffer;
modifying an input bit sequence containing original bits by interspersing the plurality of padding bits with the original bits to suppress noise at one or more target frequencies; and
transmitting the modified input bit sequence on the data bus.

5. The data bus interface of claim 1, wherein each padding bit of the plurality of padding bits in the modified bit sequence is set at a same logic level of a transmitted bit immediately preceding the padding bit, thereby avoiding the occurrence of a logic level change between the padding bit and the immediately preceding bit.

6. The data bus interface of claim 1, wherein each padding bit of the plurality of padding bits is inserted in the modified bit sequence in response to a determination, based on the values of the at least two stored bits, that a first previously transmitted bit had a different logic level than a second previously transmitted bit that was transmitted during a temporally adjacent bit transmission period to that of the first previously transmitted bit, where the first previously transmitted bit was transmitted during a predetermined number of bit transmission periods prior to a next bit transmission period.

7. The data bus interface of claim 1, wherein:
the serializer circuit is further configured to transmit a current bit of the modified bit sequence having a current logic level on the data bus during a current bit transmission period; and
the data bus interface further comprising logic circuitry configured to supply a command to the serializer circuit indicative of whether a logic level change occurred on the data bus at a previous transition time between successively transmitted bits, the previous transition time corresponding to a predetermined time duration prior to a next transition time, the next transition time being a time between the current bit transmission period and a next bit transmission period; and
the serializer circuit is responsive to the command to transmit a padding bit by maintaining the current logic level on the data bus during the next bit transmission period if the command indicates that the logic level change occurred, but otherwise to transmit a next original bit of the input bit sequence during the next bit transmission period.

8. The data bus interface of claim 7, wherein the transmitted current bit is one of an original bit of the input bit sequence, or one of the plurality of padding bits.

9. The data bus interface of claim 7, wherein the logic circuitry comprises an XNOR gate means that supplies the command based on a first and second inputs from the history buffer,
the first input representing a logic level of an Nth storage cell of the history buffer, the second input representing a logic level of a (N+1)st storage cell of the history buffer, the Nth and (N+1)st storage cells storing Nth and (N+1)st bits, representing bits previously transmitted on the data bus immediately before and after the previous transition time, respectively, where N is an integer.

10. The data bus interface of claim 9, wherein when the padding bit is transmitted, the history buffer is updated by storing a logic value corresponding to the padding bit in a first storage cell of the history buffer, and shifting the Nth bit to the (N+1)st cell.

11. The data bus interface of claim 1, wherein the input bit sequence is received by the serializer circuit from a processor as parallel data provided based on a first clock rate, the serializer circuit converting the parallel data to serial data output based on a second clock rate higher than the first clock rate.

12. The data bus interface of claim 1, wherein the history buffer comprises:
a series of flip flops arranged as a shift register, each flip flop acting as a storage cell of the history buffer, with a first one of the flip flops receiving at an input port thereof a data bit coinciding with a currently transmitted bit on the data bus, and each flip flop having a latched output port;
first and second multiplexers each having input lines connected to respective ones of the latched output ports of the flip flops, the first multiplexer receiving a first selection control signal having a first value, the second multiplexer receiving a second selection control signal having a second value one integer higher than the first value, the first and second multiplexers providing outputs of the history buffer representing data bit values at latched output ports of two adjacently arranged flip flops selected via the first and second selection control signals.

13. The data bus interface of claim 12, wherein the history buffer further comprises
an adder circuit that increments the value of the first selection control signal by one to provide the second selection control signal to the second multiplexer.

14. The data bus interface of claim 1, further comprising a counter to count a number of padding bits that have been transmitted over the data bus, and to provide a control signal to the serializer circuit for suspending the addition of padding bits based at least in part on the count number.

15. The data bus interface of claim 14, wherein the counter increments a count for every padding bit transmitted and decrements the count for every K clock cycles, and wherein the control signal for suspending the addition of padding bits is provided when the count reaches a predefined threshold.

16. The data bus interface of claim 1, wherein the at least two bits stored in the history buffer are first, second, third and fourth stored bits; and each padding bit of the plurality of padding bits is inserted in the modified bit sequence in response to a determination, based on the values of the first and second stored bits, that a first previously transmitted bit had a different logic level than a second previously transmitted bit that was transmitted during a temporally adjacent bit transmission period to that of the first previously transmitted bit,
where the first previously transmitted bit was transmitted during a first predetermined number of bit transmission periods prior to a next bit transmission period, or, based on the values of the third and fourth stored bits, that a third previously transmitted bit had a different logic level than a fourth previously transmitted bit that was transmitted during a temporally adjacent bit transmission period to that of the third previously transmitted bit, where the third previously transmitted bit was transmitted during a second predetermined number of bit transmission periods prior to the next bit transmission period.

17. The data communication system of claim 2, comprising:
a first integrated circuit comprising the transmit interface circuit and a first processor that provides the input bit sequence; and
a second integrated circuit comprising the receive interface circuit and a second processor, the receive interface circuit outputting the recovered input bit sequence to the second processor.

18. The data communication system of claim 2, wherein the commands are generated by an XNOR gate means coupled between the receive history buffer and the data recovery circuit, the XNOR gate means supplying each command of the commands based on first and second outputs of the receive history buffer, the first output representing a logic level of an Nth storage cell of the receive history buffer, the second output representing a logic level of a (N+1)st cell of the receive history buffer, the Nth and (N+1)st storage cells storing Nth and (N+1)st bits, representing consecutive bits previously received via the data bus immediately before and after a previous transition time, respectively, where N is an integer.

19. The data communication system of claim 2, wherein:
the transmit interface circuit further comprises a first counter to count a first number of padding bits that have been transmitted over the data bus, and to provide a first control signal to the serializer circuit for suspending the addition of padding bits based at least in part on the count number; and
the receive interface circuit further comprises a second counter to count a second number of padding bits detected and to provide a second control signal to the data recovery circuit to suspend discarding of bits based at least in part on the second count number.

20. The data communication system of claim 2, wherein the data recovery circuit comprises a deserializer.

21. The data communication system of claim 2, comprising a processor executing instructions from a memory, the processor comprises the data recovery circuit, and the memory comprises the receive history buffer.

22. The data communication method of claim 4, further comprising:
transmitting a current bit of the modified bit sequence having a current logic level on the data bus during a current bit transmission period;
determining whether a logic level change occurred on the data bus at a previous transition time corresponding to a predetermined time duration prior to a next transition time, the next transition time being a time between the current bit transmission period and a next bit transmission period; and if the logic level change occurred, transmitting a next padding bit by maintaining the current logic level on the data bus for the next bit transmission period.

23. The data communication method of claim 22, wherein the transmitted current bit is one of the original bits of the input bit sequence, or another padding bit, and the method further comprises:

if the logic level change did not occur, transmitting a next original bit of the input bit sequence over the data bus.

24. The data communication method of claim 22, wherein the history buffer is a transmit side history buffer having Nth and (N+1)st storage cells storing Nth and (N+1)st bits, representing bits previously transmitted on the data bus before and after the previous transition time, respectively, where N is an integer; and said determining whether a logic level change occurred on the data bus comprises determining whether the logic values of the Nth and (N+1)st bits differ, wherein a difference therebetween coincides with a logic level change.

25. The data communication method of claim 24, further comprising, when said next padding bit is transmitted, updating the transmit side history buffer by:

storing a logic value corresponding to said next padding bit in a first storage cell of the transmit side history buffer; and shifting the Nth bit to the (N+1)st cell.

26. The data communication method of claim 22, further comprising:

at a receiving side, receiving the current bit and said next padding bit via the data bus; and determining at the receiving side whether the logic level change occurred on the data bus at the transition time, if so, detecting that said next padding bit is not an original bit of an original bit sequence for which data recovery is sought, and discarding said next padding bit during data recovery of the original bit sequence.

27. The data communication method of claim 26, wherein determining at the receiving side whether the logic level change occurred comprises:

maintaining a receive side history buffer having Nth and (N+1)st storage cells storing Nth and (N+1)st bits, representing bits previously transmitted on the data bus before and after the previous transition time, respectively, where N is an integer; and determining whether the logic values of the Nth and (N+1)st bits differ, wherein a difference therebetween indicates that said next padding bit was not an original bit.

28. The data communication method of claim 22, wherein:

each of the plurality of padding bits and original bits is transmitted within a respective one of periodic bit transmission periods; and the periodic bit transmission periods are synchronized with a clock signal supplied to interface circuitry on each of a transmit side and a receive side of the data bus.

29. The data communication method of claim 28, wherein each bit transmission period has a duration equaling one clock cycle of the clock signal.

30. The data communication method of claim 22, wherein the determining whether a logic level change occurred on the data bus is performed by a processor executing program instructions read from a memory, wherein the processor uses storage locations of the memory as the history buffer.

31. The data communication method of claim 4, further comprising:

transmitting a current bit of the modified bit sequence at a current logic level on the data bus during a current bit transmission period;

determining whether a first logic level change occurred on the data bus at a first predetermined time prior to the start of a next bit transmission period succeeding the current bit transmission period;

determining whether at least one second logic level change occurred on the data bus at at least one second predetermined time prior to the start of the next bit transmission period; and if one or more of the first logic level change and the at least one second logic level change occurred, transmitting a next padding bit by maintaining the current logic level for the next bit transmission period.

* * * * *